US012166386B2

(12) United States Patent
Takada et al.

(10) Patent No.: US 12,166,386 B2
(45) Date of Patent: Dec. 10, 2024

(54) STATOR, MOTOR, AND METHOD FOR MANUFACTURING STATOR

(71) Applicant: NIDEC CORPORATION, Kyoto (JP)

(72) Inventors: Hibiki Takada, Kyoto (JP); Takahiro Hiwa, Kyoto (JP); Hisashi Fujihara, Kyoto (JP); Tatsuhiko Mizutani, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 454 days.

(21) Appl. No.: 17/616,185

(22) PCT Filed: Jun. 1, 2020

(86) PCT No.: PCT/JP2020/021517
§ 371 (c)(1),
(2) Date: Dec. 3, 2021

(87) PCT Pub. No.: WO2020/246406
PCT Pub. Date: Dec. 10, 2020

(65) Prior Publication Data
US 2022/0247287 A1  Aug. 4, 2022

(30) Foreign Application Priority Data

Jun. 6, 2019 (JP) .................................. 2019-106505

(51) Int. Cl.
*H02K 15/085* (2006.01)
*H02K 1/16* (2006.01)
*H02K 15/04* (2006.01)

(52) U.S. Cl.
CPC ............. *H02K 15/085* (2013.01); *H02K 1/16* (2013.01); *H02K 15/04* (2013.01)

(58) Field of Classification Search
None
See application file for complete search history.

(56) References Cited

U.S. PATENT DOCUMENTS 10,491,070 B2   11/2019  Tamura
10,658,897 B2 *  5/2020  Lee .......................... H02K 3/28
(Continued)

FOREIGN PATENT DOCUMENTS

CN   202353351 U   7/2012
JP   201355798 A   3/2013
(Continued)

OTHER PUBLICATIONS

Machine Translation of JP2013055798A (Year: 2013).*
International Search Report in PCT/JP2020/021517, mailed Aug. 4, 2020. 4pp.

*Primary Examiner* — Bernard Rojas
(74) *Attorney, Agent, or Firm* — HAUPTMAN HAM, LLP

(57) ABSTRACT

A stator includes a stator core, three-phase coils, three external terminals, and three busbars. Each of the three-phase coils has a first coil end protruding from the radially outermost side of a slot to a first side in the axial direction of the stator core. Each of the three bus bars includes a busbar body portion extending in a circumferential direction of the stator core, a busbar connection portion extending toward the first side in the axial direction, and an external terminal connection portion extending outward in the radial direction and connected to the external terminal. The first coil end extends in the radial direction through between the busbar body portion and the stator core in the axial direction, extends toward the first side in the axial direction on a radially outer side of the busbar body portion, and has a tip connected to the busbar connection portion from the radially outer side.

8 Claims, 14 Drawing Sheets

(56) References Cited

U.S. PATENT DOCUMENTS

| | | | |
|---|---|---|---|
| 10,673,296 B2 | 6/2020 | Asahi et al. | |
| 2009/0267441 A1* | 10/2009 | Hiramatsu | H02K 15/066 |
| | | | 310/215 |
| 2017/0033630 A1* | 2/2017 | Tamura | H02K 3/18 |
| 2020/0212770 A1 | 7/2020 | Yoshikawa et al. | |

FOREIGN PATENT DOCUMENTS

| | | | |
|---|---|---|---|
| JP | 2016101003 A | 5/2016 | |
| JP | 201941440 A | 3/2019 | |
| WO | 2019065141 A1 | 4/2019 | |

* cited by examiner

STATOR, MOTOR, AND METHOD FOR MANUFACTURING STATOR

CROSS-REFERENCE TO RELATED APPLICATIONS

This is the U.S. national stage of application No. PCT/JP2020/021517, filed on Jun. 1, 2020, and priority under 35 U.S.C. § 119(a) and 35 U.S.C. § 365(b) is claimed from Japanese Patent Application No. 2019-106505, filed on Jun. 6, 2019.

FIELD OF THE INVENTION

The present invention relates to a stator, a motor, and a method for manufacturing the stator. The present invention claims priority based on Japanese Patent Application No. 2019-106505 filed in Japan on Jun. 6, 2019, the contents of which are incorporated herein by reference.

BACKGROUND

A stator using a busbar as a connection member for electrically connecting a coil and an external device is known. A power feeder including a busbar as the connection member is known. The power feeder includes a coil-side terminal connected to a coil, an external-side terminal connected to a terminal block included in an external power circuit, and a power feeder body that couples the coil-side terminal and the external-side terminal. The power feeder is located on the outer peripheral side of a coil end portion in the radial direction.

Meanwhile, the member located on the outer peripheral side of the coil end portion in the radial direction can be moved toward the outside in the radial direction. Therefore, in a stator in which the power feeder (busbar) is located on the outer peripheral side of the coil end portion in the radial direction, the position of the power feeder may be displaced in the radial direction, when the coil and the coil-side terminal of the power feeder are connected.

SUMMARY

An exemplary stator according to the present invention includes: a stator core having a plurality of slots extending in an axial direction; multi-phase coils partially accommodated in the plurality of slots; a plurality of external terminals; and a plurality of busbars electrically connecting the plurality of external terminals and the multi-phase coils. Each of the multi-phase coils includes a coil end that is located at an end of the coil and that protrudes to a first side in the axial direction of the stator core from an outermost side of the slot in a radial direction. Each of the plurality of busbars includes: a busbar body portion that is positioned to overlap the coil end when viewed in the radial direction of the stator core and that extends in a circumferential direction of the stator core; a busbar connection portion extending toward the first side in the axial direction from the busbar body portion; and an external terminal connection portion extending outward in the radial direction from the busbar body portion and connected to the external terminal. At least one of the coil ends of the multi-phase coils extends in the radial direction through between the busbar body portion and the stator core in the axial direction, extends toward the first side in the axial direction on an outside of the busbar body portion in the radial direction, and has a tip connected to the busbar connection portion from the outside in the radial direction.

An exemplary motor according to the present invention includes the stator described above.

An exemplary method for manufacturing a stator according to the present invention is a method for manufacturing a stator in which multi-phase coils that are partially accommodated in a plurality of slots of a stator core are electrically connected to an external terminal using a busbar. The method for manufacturing the stator includes: a coil arrangement step for inserting the multi-phase coils into the slots and allowing coil ends of the multi-phase coils to protrude from an outermost side of the slots in a radial direction to a first side in an axial direction of the stator core; a coil end formation step for bending at least one of the coil ends of the multi-phase coils outward in the radial direction and bending a tip side of the coil end to the first side in the axial direction to form a coil end that supports the busbar; a busbar arrangement step for placing at least one of a plurality of busbars on the first side in the axial direction and on an inside in the radial direction of the coil end that supports the busbar, each of the plurality of busbars including a busbar body portion extending in a circumferential direction of the stator core and a busbar connection portion extending to the first side in the axial direction from the busbar body portion; and a busbar connection step for connecting the coil end to the busbar connection portion.

The above and other elements, features, steps, characteristics and advantages of the present disclosure will become more apparent from the following detailed description of the preferred embodiments with reference to the attached drawings.

DETAILED DESCRIPTION

Figure 1:
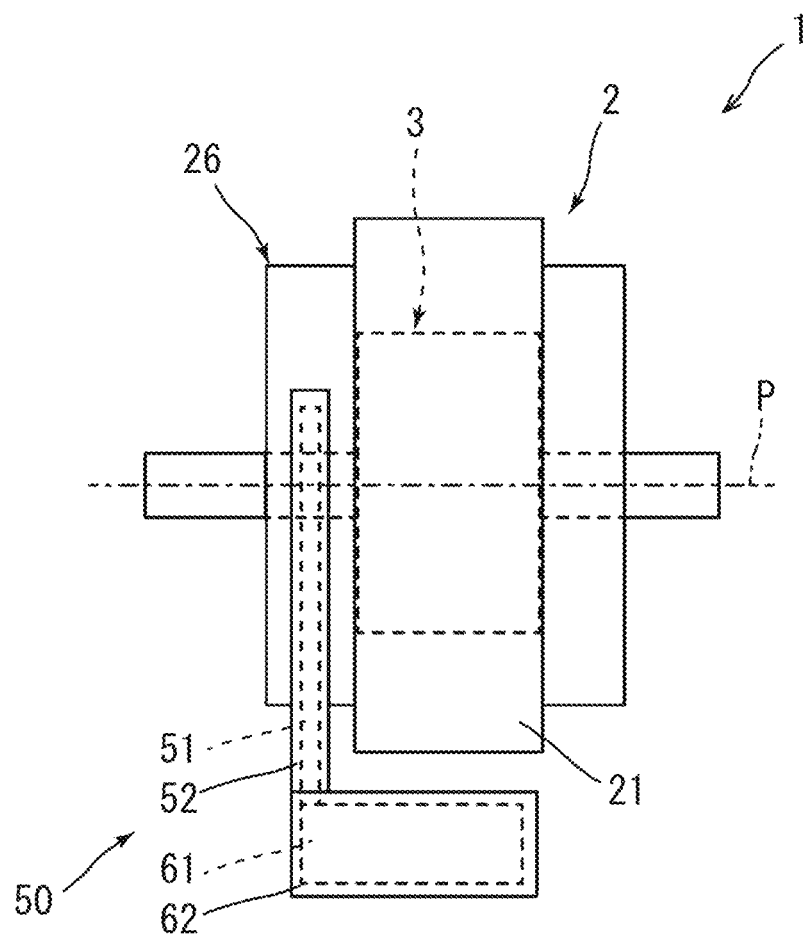
FIG. 1 is a diagram illustrating a schematic configuration of a motor according to a first embodiment.

Embodiments of the present invention will be described below in detail with reference to the drawings. The same or corresponding parts in the drawings are denoted by the same reference numerals, and the description thereof will not be repeated. The constituent members in the drawings are not limited to have the dimensions and the dimensional ratios illustrated in the drawings.

In the following description, a direction parallel to a central axis of a stator is referred to as an "axial direction", a direction perpendicular to the central axis is referred to by the term "radial direction" or "radially", and a direction along an arc around the central axis is referred to as a "circumferential direction". In addition, regarding the axial direction, a side where a busbar is located with respect to the stator is referred to as a "first side", and a side opposite to the side where the busbar is located with respect to the stator is referred to as a "second side". That is, in the present specification, an upper side is the "first side", and a lower side is the "second side" in FIG. 2. However, there is no intention to limit the direction at the time of using a motor according to the present invention by the definitions of the directions.

Further, in the following description, expressions such as "fixed", "connected", and "attached" (hereinafter, fixed, etc.) are used not only when the members are directly fixed to each other, but also when the members are fixed via another member. That is, in the following description, the expression such as "fixed" includes the meaning indicating that the members are directly fixed and the members are indirectly fixed.

FIG. 1 shows a schematic configuration of a motor 1 according to the first embodiment of the present invention. The motor 1 includes a stator 2 and a rotor 3. The rotor 3 rotates about a central axis P with respect to the stator 2. That is, the motor 1 has the stator 2 and the rotor 3 that is rotatable with respect to the stator 2.

In the present embodiment, the motor 1 is a so-called inner rotor type motor in which the rotor 3 is located so as to be rotatable about the central axis P in the tubular stator 2. The rotor 3 includes a plurality of magnets arranged in the circumferential direction around the central axis P. Since the configuration of the rotor 3 is similar to that of a typical rotor, the detailed description of the rotor 3 will be omitted.

The stator 2 includes a stator core 21, coils 26, and a busbar unit 50. In FIG. 1, the coils 26 are illustrated in a simplified manner for the sake of description. Power is supplied to the coils 26 via busbars 51 and external terminals 61 of the busbar unit 50 described later. In the present embodiment, the coils 26 include three-phase coils 26u, 26v, and 26w as described later.

Figure 2:
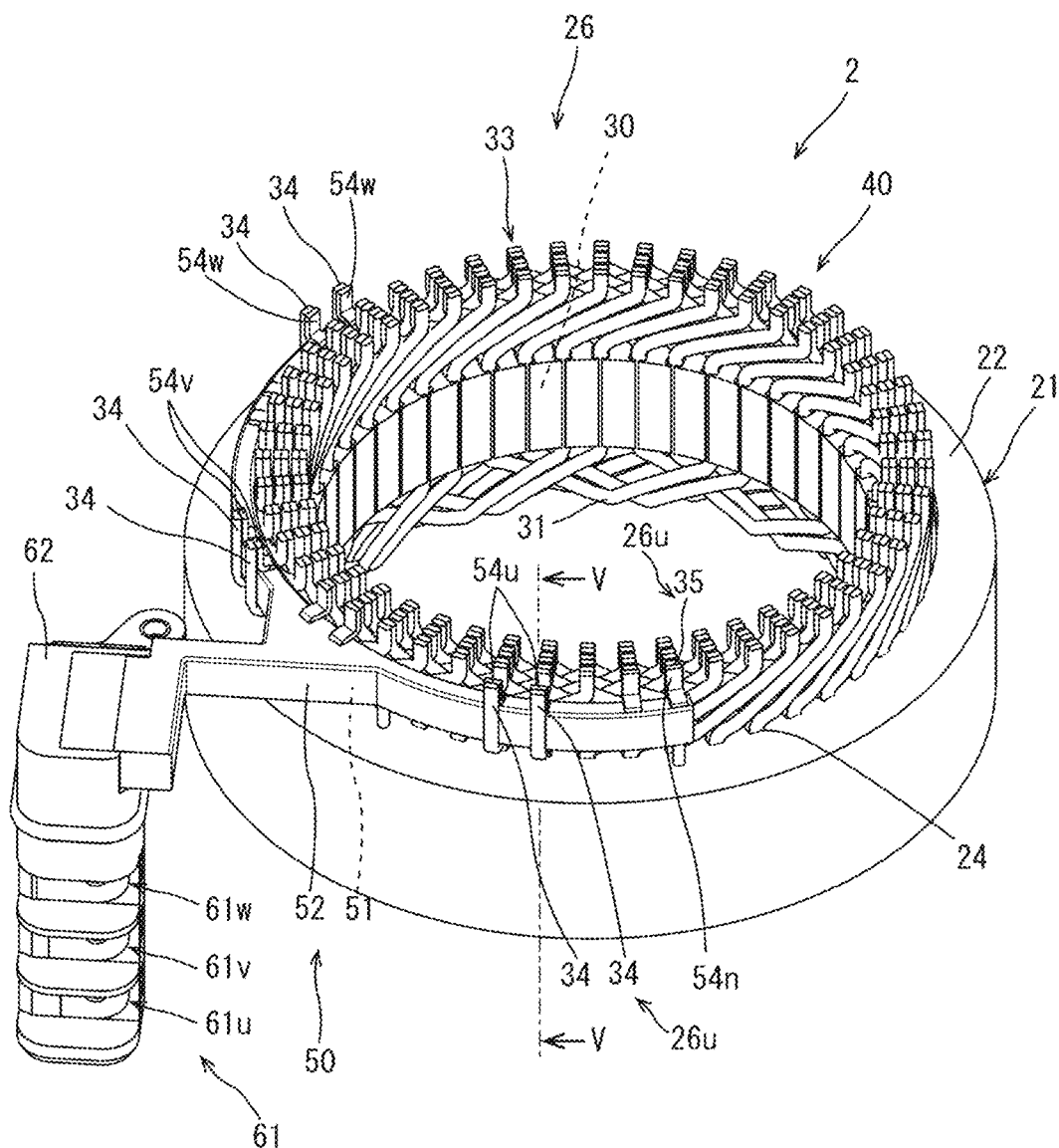
FIG. 2 is a perspective view of a stator.
Figure 3:
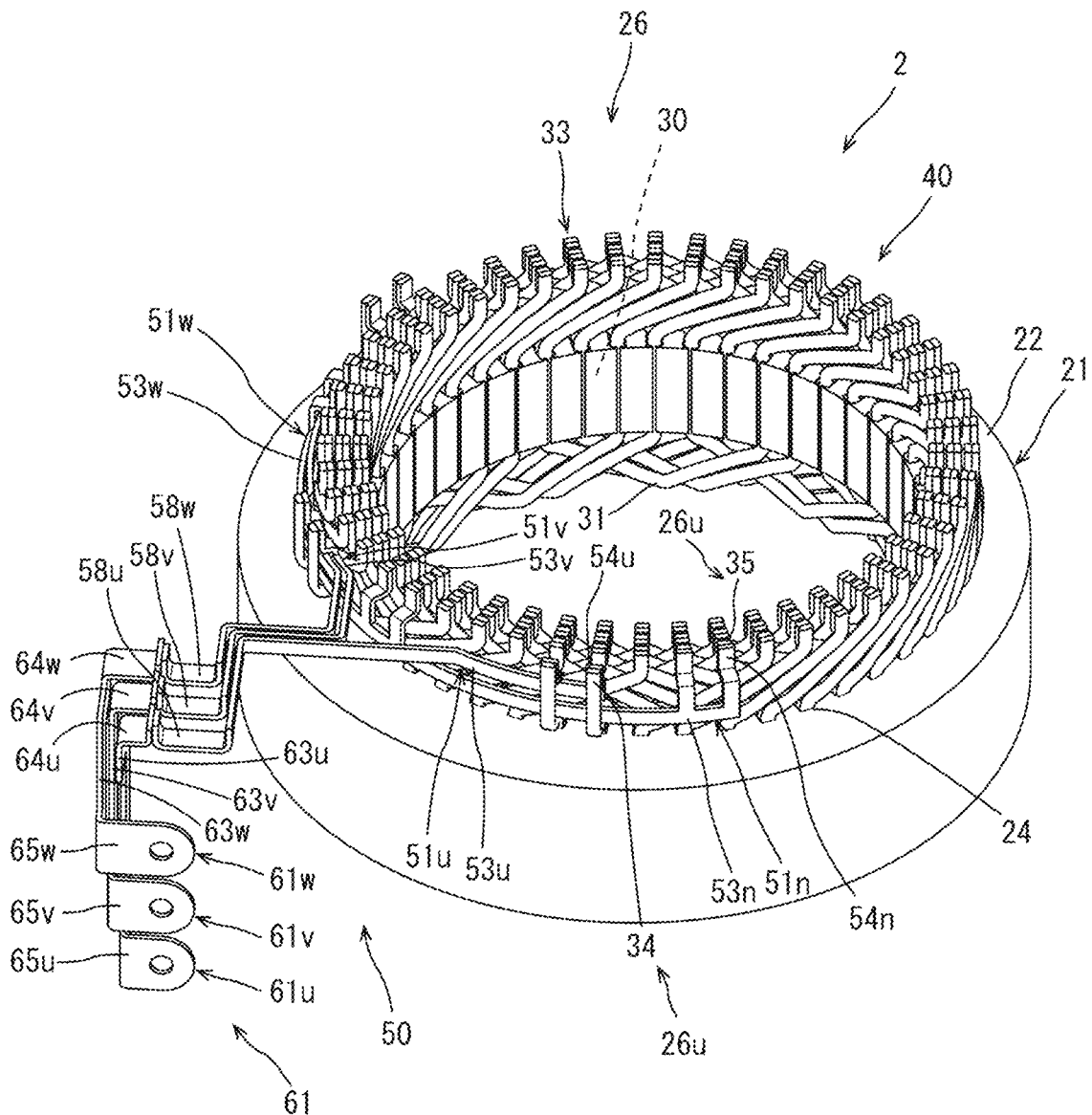
FIG. 3 is a perspective view of the stator from which a busbar holder and an external terminal holder are removed.
Figure 4:
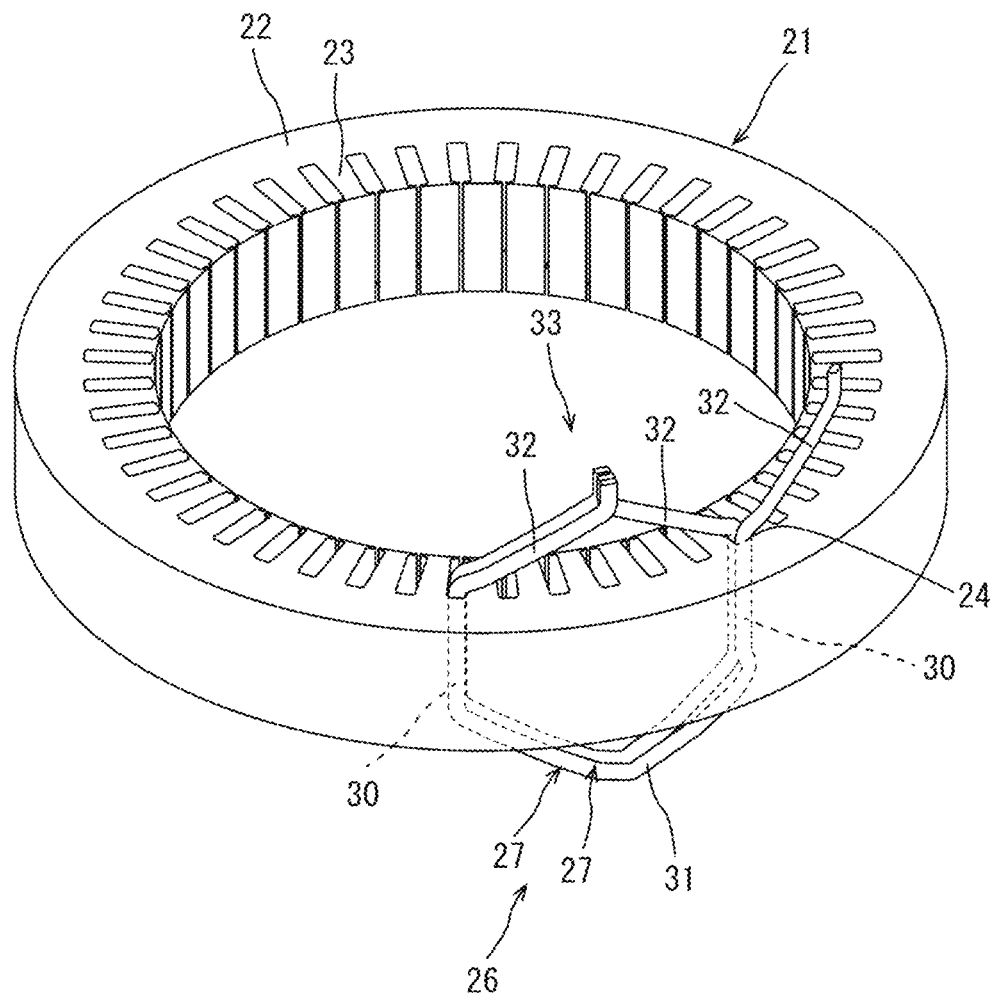
FIG. 4 is a perspective view schematically illustrating a positional relationship between a stator core and coils.

FIG. 2 is a perspective view of the stator 2 of the motor 1 according to the present embodiment. FIG. 3 is a diagram illustrating a state in which a busbar holder 52 and an external terminal holder 62 of the busbar unit 50 are removed from the stator 2 illustrated in FIG. 2. FIG. 4 is a perspective view schematically illustrating an example of a positional relationship between the stator core 21 and the coils 26. FIG. 4 only illustrates a part of the coils 26 located in slots 24 of the stator core 21 for the sake of description.

The stator core 21 has a cylindrical shape extending in the axial direction. The stator core 21 is obtained by stacking a plurality of electromagnetic steel sheets formed in a predetermined shape in the thickness direction.

The stator core 21 includes a cylindrical yoke 22, a plurality of teeth 23 (see FIG. 4) extending inward from the yoke 22 in the radial direction, and the slots 24. In the present embodiment, the stator core 21 is a cylindrical round core. The yoke 22 and the plurality of teeth 23 are integrally formed as a single member. The stator core 21 may be, for example, a split core or a straight core.

As illustrated in FIG. 4, the plurality of teeth 23 is arranged at equal intervals in the circumferential direction. Each of the teeth 23 extends from one end to the other end of the stator core 21 in the axial direction. The slot 24 is located between adjacent teeth 23 among the plurality of teeth 23. The slot 24 is a groove extending in the axial direction in the stator core 21. The slot 24 extends along the central axis P. The stator core 21 has a plurality of slots 24 arranged in the circumferential direction on the inner peripheral surface. As will be described later, a plurality of coils 26 is inserted into the plurality of slots 24.

In the present embodiment, the coils 26 include a U-phase coil 26u, a V-phase coil 26v, and a W-phase coil 26w. The coils 26 are wound around the plurality of teeth 23 in a distributed winding, and are Y-connected by the four busbars 51. In the present embodiment, the coils 26 include two sets of U-phase coils 26u, V-phase coils 26v, and W-phase coils 26w. In the following description and drawings, when it is necessary to distinguish the phases of the respective components, u, v, w, and n indicating the U phase, the V phase, the W phase, and the neutral point are added to the end of the reference numerals of the respective components.

In each of the U-phase coil 26u, the V-phase coil 26v, and the W-phase coil 26w, multiple segment coils 27 are connected in series. Each segment coil 27 has a rectangular cross-sectional shape and is constituted by a bent rectangular wire. Note that the cross-sectional shape of the segment coil 27 may not be rectangular as long as it is made of a material having high rigidity.

As illustrated in FIGS. 2 to 4, each segment coil 27 includes a pair of linear slot accommodation portions 30 located in the slots 24, a segment coil connection portion 31 connecting the pair of slot accommodation portions 30, and a pair of segment coil end portions 32 which are ends of the segment coil 27. The plurality of segment coils may include a segment coil having a linear slot accommodation portion and segment coil end portions located at both ends of the slot accommodation portion.

The slot accommodation portions 30 of the plurality of segment coils 27 are accommodated in the slots 24 while being overlapped in the radial direction. The segment coil connection portions 31 of the plurality of segment coils 27 are positioned on the second side in the axial direction with respect to the stator core 21 in a state where the slot accommodation portions 30 are accommodated in the slots 24 of the stator core 21. The slot accommodation portion 30 constitutes slot accommodation portion of the coil 26. The segment coil connection portion 31 constitutes a first coil connection portion of the coil 26. In the following description, the slot accommodation portion of the coil 26 is denoted by the same reference numeral as the slot accommodation portion 30 of the segment coil 27, and the first coil connection portion of the coil 26 is also denoted by the same reference numeral as the segment coil connection portion 31 of the segment coil 27.

In the plurality of segment coils 27, the tip of one of the pair of segment coil end portions 32 in each segment coil 27 and the tip of one of the pair of segment coil end portions 32 in the other segment coil 27 are connected by welding or the like in a state where the slot accommodation portions 30 are accommodated in the slots 24. That is, the pair of segment coil end portions 32 in each segment coil 27 is connected to the segment coil end portions 32 of the different segment coil 27. Thus, the plurality of segment coils 27 is connected in series. The U-phase coil 26u, the V-phase coil 26v, and the W-phase coil 26w are each constituted by the plurality of segment coils 27 connected in series in this manner.

In the present embodiment, the connected segment coil end portions 32 constitute a second coil connection portion 33 that connects the pair of slot accommodation portions 30 in each of the U-phase coil 26u, the V-phase coil 26v, and the W-phase coil 26w. The second coil connection portion 33 is located on the first side in the axial direction with respect to the stator core 21.

Each of the U-phase coil 26u, the V-phase coil 26v, and the W-phase coil 26w has a pair of segment coil end portions 32 that is not connected to the segment coil end portions 32 of the other segment coil 27. The segment coil end portions 32 that are not connected to the other segment coil end portions 32 in the U-phase coil 26u, the V-phase coil 26v, and the W-phase coil 26w are coil ends of the U-phase coil 26u, the V-phase coil 26v, and the W-phase coil 26w. The coil ends of the U-phase coil 26u, the V-phase coil 26v, and the W-phase coil 26w are located at one end and the other end of the coil of each phase. The coil ends of the U-phase coil 26u, the V-phase coil 26v, and the W-phase coil 26w protrude to the first side in the axial direction of the stator core 21.

Hereinafter, for the sake of description, the ends of the coil located at both ends of each of the U-phase coil 26u, the V-phase coil 26v, and the W-phase coil 26w are referred to as a first coil end 34 and a second coil end 35, respectively.

That is, the coils 26 of the present embodiment include the U-phase coil 26u, the V-phase coil 26v, and the W-phase coil 26w, and the coils 26 include the plurality of slot accommodation portions 30 positioned in the plurality of slots, the plurality of second coil connection portions 33 positioned on the first side in the axial direction with respect to the stator core 21 and connecting the slot accommodation portions 30, the plurality of first coil connection portions 31 positioned on the second side in the axial direction with respect to the stator core 21 and connecting the slot accommodation portions 30, and the first coil ends 34 and the second coil ends 35 positioned at the ends of the coils 26, extending from the slot accommodation portions 30, and protruding to the first side in the axial direction of the stator core 21.

With this configuration, the coil end portion 40 that includes the plurality of second coil connection portions 33 protruding from the stator core 21 to the first side in the axial direction is formed on the first side in the axial direction with respect to the stator core 21. A coil end portion that includes the plurality of first coil connection portions 31 protruding from the stator core 21 to the second side is formed on the second side in the axial direction with respect to the stator core 21.

In the present embodiment, all the second coil connection portions 33 are positioned on the first side in the axial direction (upper side in FIG. 2) with respect to the stator core 21, and all the first coil connection portions 31 are positioned on the second side in the axial direction (lower side in FIG. 2) with respect to the stator core 21. In addition, all the first coil ends 34 and all the second coil ends 35 are located on the first side in the axial direction where the second coil connection portions 33 are located.

The first coil end 34 and the second coil end 35 of each of the U-phase coil 26u, the V-phase coil 26v, and the W-phase coil 26w extend from the slot accommodation portions 30 located on the radially outermost side of the slots 24 and protrude from the stator core 21. The first coil end 34 and the second coil end 35 are the segment coil end portions 32 of the segment coil 27 located on the radially outermost side of the slots 24 in the U-phase coil 26u, the V-phase coil 26v, and the W-phase coil 26w. In the present embodiment, the coils 26 include two sets of U-phase coils 26u, V-phase coils 26v, and W-phase coils 26w. Therefore, six first coil ends 34 and six second coil ends 35 are located on the first side in the axial direction with respect to the stator core 21.

In the first coil end 34 of each of the U-phase coil 26u, the V-phase coil 26v, and the W-phase coil 26w, a part protruding from the stator core 21 extends outward in the radial direction of the stator core 21, and has a tip extending toward the first side in the axial direction of the stator core 21.

Figure 5:
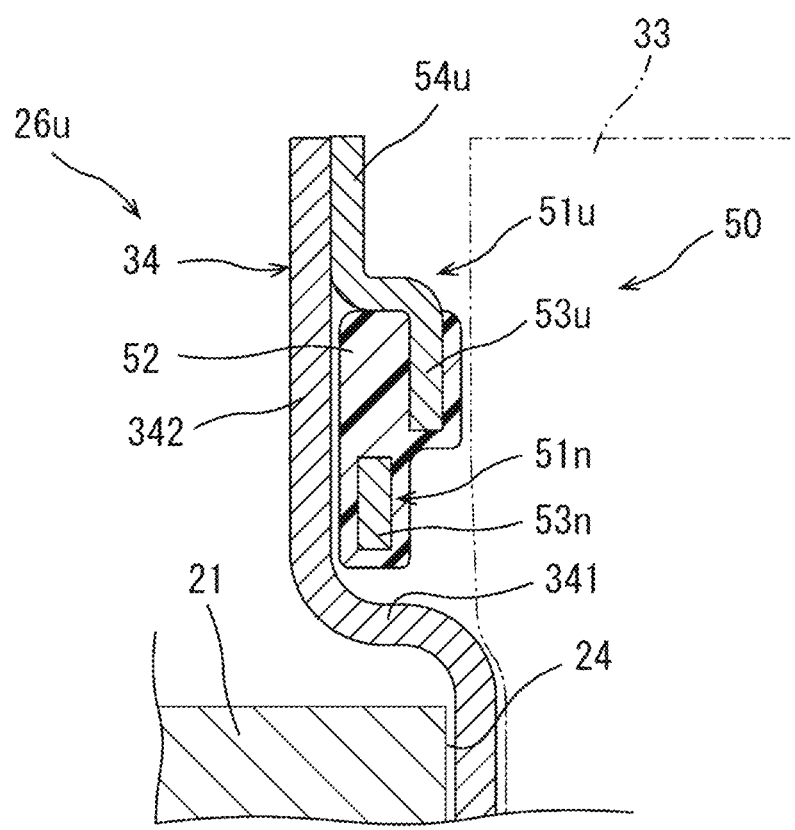
FIG. 5 is a sectional view taken along line V-V in FIG. 2.

FIG. 5 is a sectional view taken along line V-V of FIG. 2. As illustrated in FIG. 5, the first coil end 34 of the U-phase coil 26u includes an axial support portion 341 extending outward in the radial direction from the part protruding from the stator core 21, and a radial external support portion 342 extending to the first side in the axial direction from one end of the axial support portion 341. A part of the busbar unit 50 described later is located on the first side in the axial direction with respect to the axial support portion 341 and on the radially inner side with respect to the radial external support portion 342.

In the present embodiment, the first coil ends 34 and the second coil ends 35 extend from the slot accommodation portions 30 located on the radially outermost side of the slots 24 and protrude from the stator core 21. The first coil end 34 has the axial support portion 341 and the radial external support portion 342. However, at least a part of the first coil ends 34 and the second coil ends 35 may extend from the slot accommodation portion 30 located on the radially outermost side of the slot 24 and protrude to the first side in the axial direction of the stator core 21. In this case, it is only sufficient that at least a part of the coil ends that extend from the slot accommodation portions 30 located on the radially outermost side of the slots 24 and that protrude to the first side in the axial direction of the stator core 21 serves the coil end having the axial support portion 341 and the radial external support portion 342.

The relationship between the first coil end 34 and the busbar unit 50 will be described later.

As illustrated in FIG. 2, the busbar unit 50 includes the busbars 51, the busbar holder 52, the external terminals 61, and the external terminal holder 62.

Figure 6A:
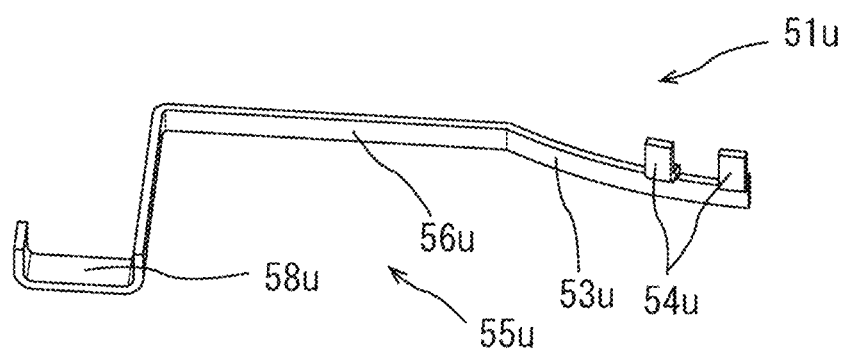
FIG. 6A is a perspective view illustrating a schematic configuration of a U-phase busbar.
Figure 6B:
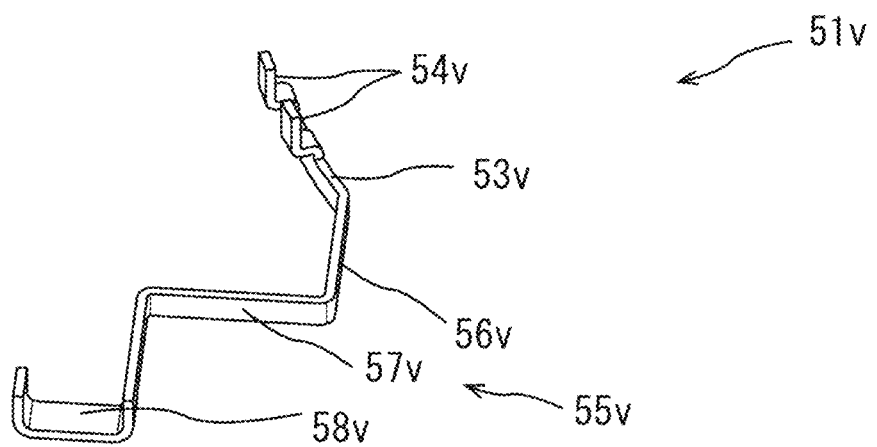
FIG. 6B is a perspective view illustrating a schematic configuration of a V-phase busbar.
Figure 6C:
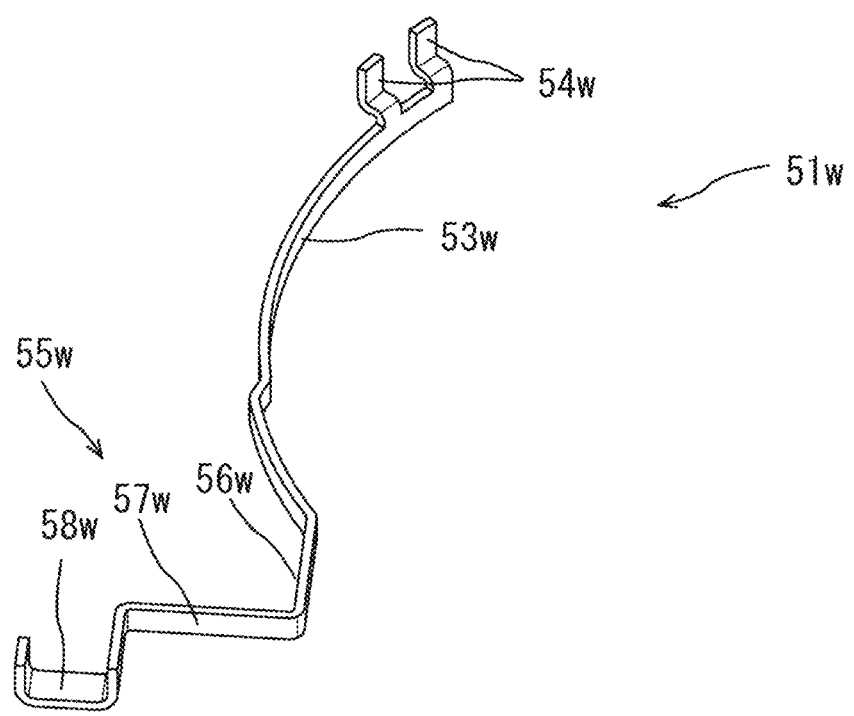
FIG. 6C is a perspective view illustrating a schematic configuration of a W-phase busbar.
Figure 6D:
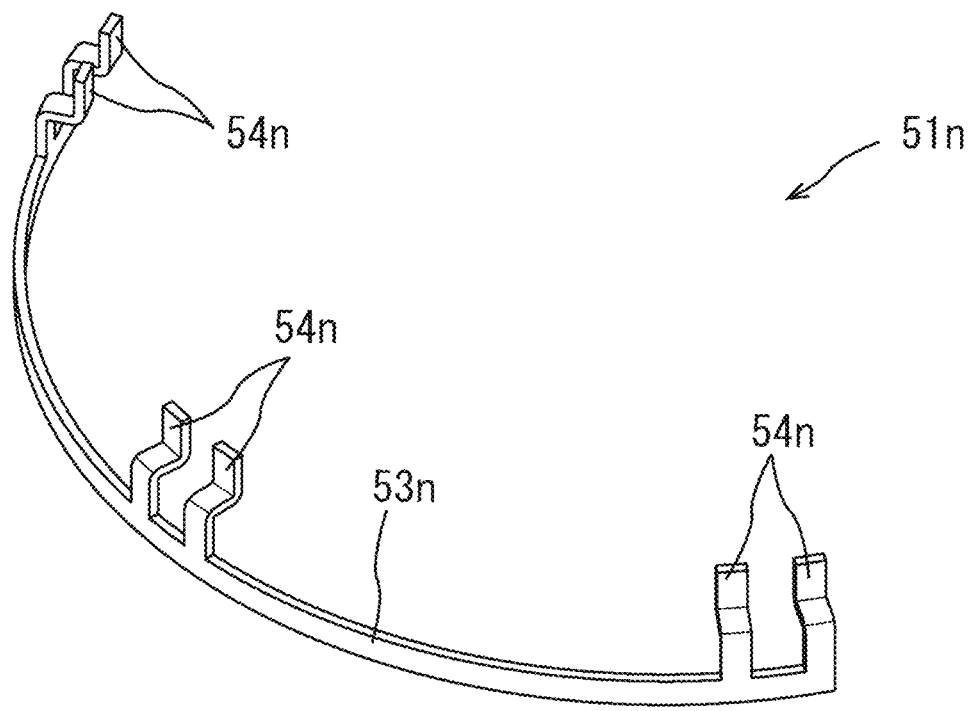
FIG. 6D is a perspective view illustrating a schematic configuration of a neutral point busbar.

As illustrated in FIG. 3, the busbars 51 include a U-phase busbar 51u, a V-phase busbar 51v, a W-phase busbar 51w, and a neutral point busbar 51n. FIG. 6A illustrates a schematic configuration of the U-phase busbar 51u, FIG. 6B illustrates a schematic configuration of the V-phase busbar 51v, FIG. 6C illustrates a schematic configuration of the W-phase busbar 51w, and FIG. 6D illustrates a schematic configuration of the neutral point busbar 51n. Each of the U-phase busbar 51u, the V-phase busbar 51v, the W-phase busbar 51w, and the neutral point busbar 51n is a plate-shaped member. The thickness direction of each of the U-phase busbar 51u, the V-phase busbar 51v, the W-phase busbar 51w, and the neutral point busbar 51n coincides with the radial direction of the stator core 21.

As illustrated in FIG. 6A, the U-phase busbar 51u includes a U-phase busbar body portion 53u, two U-phase busbar connection portions 54u, and a U-phase external terminal connection portion 55u. The U-phase busbar body portion 53u, the two U-phase busbar connection portions 54u, and the U-phase external terminal connection portion 55u are integrally formed as a single member.

As illustrated in FIG. 6B, the V-phase busbar 51v includes a V-phase busbar body portion 53v, two V-phase busbar connection portions 54v, and a V-phase external terminal connection portion 55v. The V-phase busbar body portion 53v, the two V-phase busbar connection portions 54v, and the V-phase external terminal connection portion 55v are integrally formed as a single member.

As illustrated in FIG. 6C, the W-phase busbar 51w includes a W-phase busbar body portion 53w, two W-phase busbar connection portions 54w, and a W-phase external terminal connection portion 55w. The W-phase busbar body portion 53w, the two W-phase busbar connection portions 54w, and the W-phase external terminal connection portion 55w are integrally formed as a single member.

As illustrated in FIG. 6D, the neutral point busbar 51n includes a neutral point busbar body portion 53n and six neutral point busbar connection portions 54n. The neutral point busbar body portion 53n and the six neutral point busbar connection portions 54n are integrally formed as a single member.

Each of the U-phase busbar body portion 53u, the V-phase busbar body portion 53v, and the W-phase busbar body portion 53w has an arc shape along the outer periphery of the coil end portion 40 when viewed in the axial direction. Each of the U-phase busbar body portion 53u, the V-phase busbar body portion 53v, and the W-phase busbar body portion 53w is positioned to overlap the first coil end 34 of the coil 26 of each phase when viewed in the radial direction of the stator core 21, and extends in the circumferential direction of the stator core 21.

Specifically, the U-phase busbar body portion 53u is positioned to overlap the first coil ends 34 of the two U-phase coils 26u when viewed in the radial direction of the stator core 21, and extends in the circumferential direction of the stator core 21. The V-phase busbar body portion 53v is positioned to overlap the first coil ends 34 of the two V-phase coils 26v when viewed in the radial direction of the stator core 21, and extends in the circumferential direction of the stator core 21. The W-phase busbar body portion 53w of the W-phase busbar 51w is positioned to overlap the first coil ends 34 of the two W-phase coils 26w when viewed in the radial direction of the stator core 21, and extends in the circumferential direction of the stator core 21.

The neutral point busbar body portion 53n of the neutral point busbar 51n has an arc shape along the outer periphery of the coil end portion 40 when viewed in the axial direction. The neutral point busbar body portion 53n is positioned to overlap the second coil ends 35 of the two U-phase coils 26u, two V-phase coils 26v, and two W-phase coils 26w when viewed in the radial direction of the stator core 21, and extends in the circumferential direction of the stator core 21. In the present embodiment, the neutral point busbar body portion 53n is longer in the circumferential direction than the U-phase busbar body portion 53u, the V-phase busbar body portion 53v, and the W-phase busbar body portion 53w.

The U-phase external terminal connection portion 55u extends outward from one end of the U-phase busbar body portion 53u in the radial direction and is connected to the external terminal 61. The U-phase external terminal connection portion 55u includes a U-phase extension portion 56u extending outward of the stator core 21 in the radial direction from one end of the U-phase busbar body portion 53u, and a U-phase connection end portion 58u located at the tip of the U-phase extension portion 56u and connected to the external terminal 61.

The V-phase external terminal connection portion 55v extends outward from one end of the V-phase busbar body portion 53v in the radial direction and is connected to the external terminal 61. The V-phase external terminal connection portion 55v includes: a V-phase first extension portion 56v extending outward of the stator core 21 in the radial direction from one end of the V-phase busbar body portion 53v; a V-phase second extension portion 57v that is perpendicular to the V-phase first extension portion 56v and that extends toward the external terminal 61; and a V-phase connection end portion 58v located at the tip of the V-phase second extension portion 57v and connected to the external terminal 61.

The W-phase external terminal connection portion 55w extends outward from one end of the W-phase busbar body portion 53w in the radial direction and is connected to the external terminal 61. The W-phase external terminal connection portion 55w includes: a W-phase first extension portion 56w extending outward of the stator core 21 in the radial direction from one end of the W-phase busbar body portion 53w; a W-phase second extension portion 57w that is perpendicular to the W-phase first extension portion 56w and that extends toward the external terminal 61; and a W-phase connection end portion 58w located at the tip of the W-phase second extension portion 57w and connected to the external terminal 61.

The detailed configuration of the external terminal 61 will be described later.

The two U-phase busbar connection portions 54u are arranged in the circumferential direction and extend to the first side in the axial direction of the stator core 21 from the other end of the U-phase busbar body portion 53u. The two U-phase busbar connection portions 54u are connected to the first coil ends 34 of the U-phase coils 26u.

The two V-phase busbar connection portions 54v are arranged in the circumferential direction and extend to the first side in the axial direction of the stator core 21 from the other end of the V-phase busbar body portion 53v. The two V-phase busbar connection portions 54v are connected to the first coil ends 34 of the V-phase coils 26v.

The two W-phase busbar connection portions 54w are arranged in the circumferential direction and extend to the first side in the axial direction of the stator core 21 from the other end of the W-phase busbar body portion 53w. The two W-phase busbar connection portions 54w are connected to the first coil ends 34 of the W-phase coils 26w.

The six neutral point busbar connection portions 54n are arranged in pairs in the circumferential direction, extend to the first side in the axial direction of the stator core 21 from the neutral point busbar body portion 53n, and are connected to the second coil ends 35 of two sets of coils of respective phases.

Figure 7:
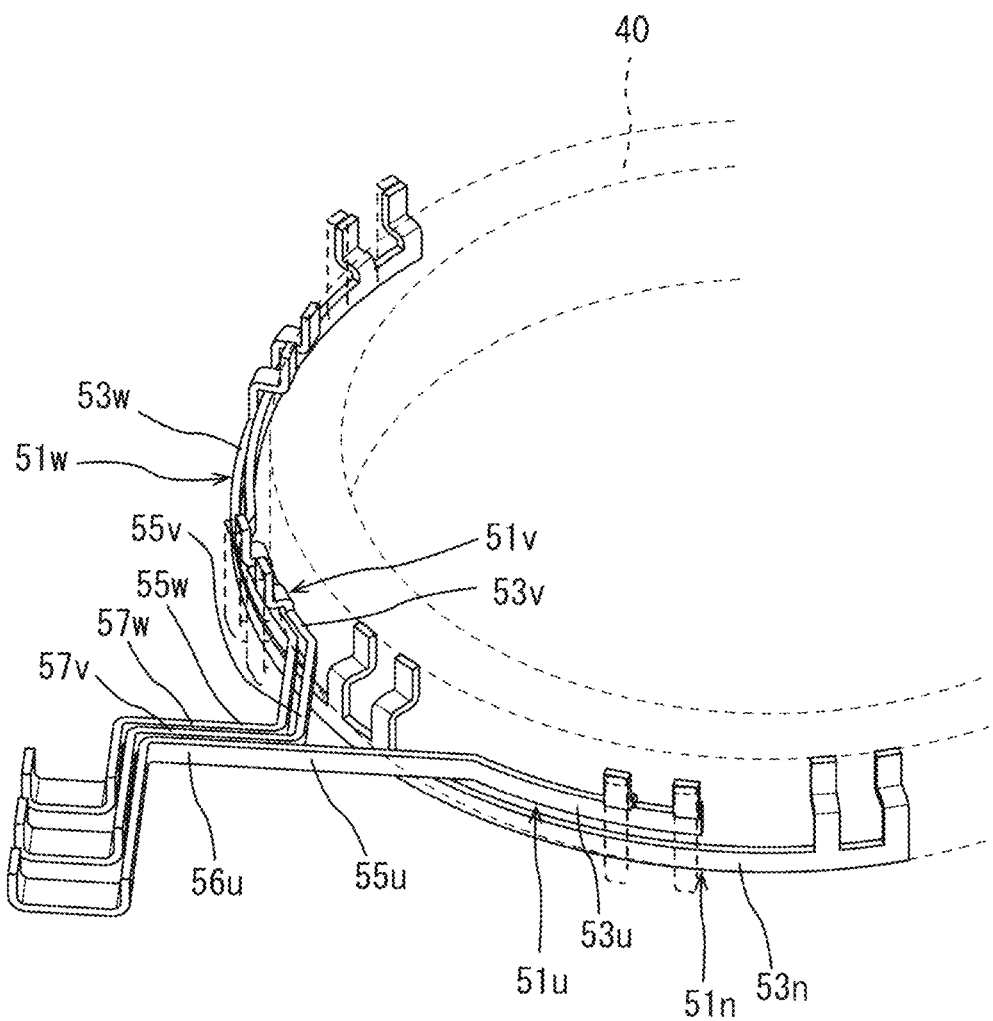
FIG. 7 is a perspective view illustrating an arrangement of the four busbars attached to a coil end portion.

The U-phase busbar 51u, the V-phase busbar 51v, the W-phase busbar 51w, and the neutral point busbar 51n are located on the outer peripheral side of the coil end portion 40 in the radial direction in a state of partially overlapping each other in the radial direction or the axial direction. FIG. 7 illustrates an example of the arrangement of the U-phase busbar 51u, the V-phase busbar 51v, the W-phase busbar 51w, and the neutral point busbar 51n with respect to the coil end portion 40.

As shown in FIG. 7, the U-phase extension portion 56u of the U-phase external terminal connection portion 55u, the V-phase second extension portion 57v of the V-phase external terminal connection portion 55v, and the W-phase second extension portion 57w of the W-phase external terminal connection portion 55w overlap each other in the thickness direction.

The U-phase busbar body portion 53u is located on a first side in the circumferential direction of the stator core 21 with respect to the U-phase external terminal connection portion 55u when viewed in the axial direction. The W-phase busbar body portion 53w is located on a second side in the circumferential direction of the stator core 21 with respect to the W-phase external terminal connection portion 55w when viewed in the axial direction. The V-phase busbar body portion 53v is located on the second side in the circumferential direction of the stator core 21 with respect to the V-phase external terminal connection portion 55v when viewed in the axial direction, and the V-phase busbar body portion 53v overlaps a part of the W-phase busbar body portion 53w when viewed in the radial direction of the stator core 21.

The neutral point busbar body portion 53n is located on the second side in the axial direction with respect to the U-phase busbar body portion 53u, the V-phase busbar body portion 53v, and the W-phase busbar body portion 53w, and a part of the neutral point busbar body portion 53n overlaps the U-phase busbar body portion 53u, the V-phase busbar body portion 53v, and the W-phase busbar body portion 53w when viewed in the axial direction.

The U-phase busbar 51u, the V-phase busbar 51v, the W-phase busbar 51w, and the neutral point busbar 51n are molded with resin except for the tips of the U-phase busbar connection portions 54u, the V-phase busbar connection portions 54v, the W-phase busbar connection portions 54w, and the neutral point busbar connection portions 54n (see FIG. 2). In the present specification, a resin portion covering the four busbars 51 is referred to as the busbar holder 52.

As described above, the four busbars 51 are covered with the busbar holder 52, so that they are not positionally displaced.

Tips of the U-phase busbar connection portions 54u, the V-phase busbar connection portions 54v, the W-phase busbar connection portions 54w, and the neutral point busbar connection portions 54n protrude from the busbar holder 52 in a state where the four busbars 51 are covered with the busbar holder 52.

The U-phase busbar connection portions 54u, the V-phase busbar connection portions 54v, the W-phase busbar connection portions 54w, and the neutral point busbar connection portions 54n protruding from the busbar holder 52 are connected to the first coil ends 34 and the second coil ends 35 of the coils 26 of respective phases. The relationship among the first coil ends 34, the busbars 51, and the busbar holder 52 will be described later.

As illustrated in FIGS. 2 and 3, the external terminals 61 include a U-phase external terminal 61u, a V-phase external terminal 61v, and a W-phase external terminal 61w. The U-phase external terminal 61u, the V-phase external terminal 61v, and the W-phase external terminal 61w are plate-shaped members and molded with resin. In the present specification, the resin portion covering the three external terminals 61 is referred to as the external terminal holder 62.

The U-phase external terminal 61u includes a U-phase terminal body portion 63u, a U-phase busbar-side connection portion 64u located at one end of the U-phase terminal body portion 63u, and a U-phase power-supply-source-side connection portion 65u located at another end of the U-phase terminal body portion 63u. The U-phase terminal body portion 63u, the U-phase busbar-side connection portion 64u, and the U-phase power-supply-source-side connection portion 65u are integrally formed as a single member.

The V-phase external terminal 61v includes a V-phase terminal body portion 63v, a V-phase busbar-side connection portion 64v located at one end of the V-phase terminal body portion 63v, and a V-phase power-supply-source-side connection portion 65v located at another end of the V-phase terminal body portion 63v. The V-phase terminal body portion 63v, the V-phase busbar-side connection portion 64v, and the V-phase power-supply-source-side connection portion 65v are integrally formed as a single member.

The W-phase external terminal 61w includes a W-phase terminal body portion 63w, a W-phase busbar-side connection portion 64w located at one end of the W-phase terminal body portion 63w, and a W-phase power-supply-source-side connection portion 65w located at another end of the W-phase terminal body portion 63w. The W-phase terminal body portion 63w, the W-phase busbar-side connection portion 64w, and the W-phase power-supply-source-side connection portion 65w are integrally formed as a single member.

The U-phase external terminal 61u, the V-phase external terminal 61v, and the W-phase external terminal 61w are molded with a resin in a state where the U-phase terminal body portion 63u, the V-phase terminal body portion 63v, and the W-phase terminal body portion 63w are overlapped in the thickness direction. Note that the external terminal holder 62 which is a resin portion molding the external terminals 61 is connected to the busbar holder 52.

The U-phase busbar-side connection portion 64u is connected to the U-phase connection end portion 58u of the U-phase busbar 51u. The V-phase busbar-side connection portion 64v is connected to the V-phase connection end portion 58v of the V-phase busbar 51v. The W-phase busbar-side connection portion 64w is connected to the W-phase connection end portion 58w of the W-phase busbar 51w.

A power supply source (not illustrated) is electrically connected to the U-phase power-supply-source-side connection portion 65u, the V-phase power-supply-source-side connection portion 65v, and the W-phase power-supply-source-side connection portion 65w. With this configuration, power is supplied to the U-phase coil 26u, the V-phase coil 26v, and the W-phase coil 26w via the U-phase busbar 51u, the V-phase busbar 51v, and the W-phase busbar 51w.

In the present embodiment, the U-phase coils 26u, the V-phase coils 26v, and the W-phase coils 26w are Y-connected by the U-phase busbar 51u, the V-phase busbar 51v, the W-phase busbar 51w, and the neutral point busbar 51n.

Specifically, the first coil ends 34 of the U-phase coils 26u are connected to the U-phase busbar connection portions 54u. The first coil ends 34 of the V-phase coils 26v are connected to the V-phase busbar connection portions 54v of the V-phase busbar 51v. The first coil ends 34 of the W-phase coils 26w are connected to the W-phase busbar connection portions 54w of the W-phase busbar 51w. Further, the six second coil ends 35 of the U-phase coils 26u, the V-phase coils 26v, and the W-phase coils 26w are connected to the neutral point busbar 51n.

Thus, the stator 2 can be obtained in which the U-phase coils 26u, the V-phase coils 26v, and the W-phase coils 26w wound around the stator core 21 are Y-connected by the U-phase busbar 51u, the V-phase busbar 51v, the W-phase busbar 51w, and the neutral point busbar 51n.

Figure 8:
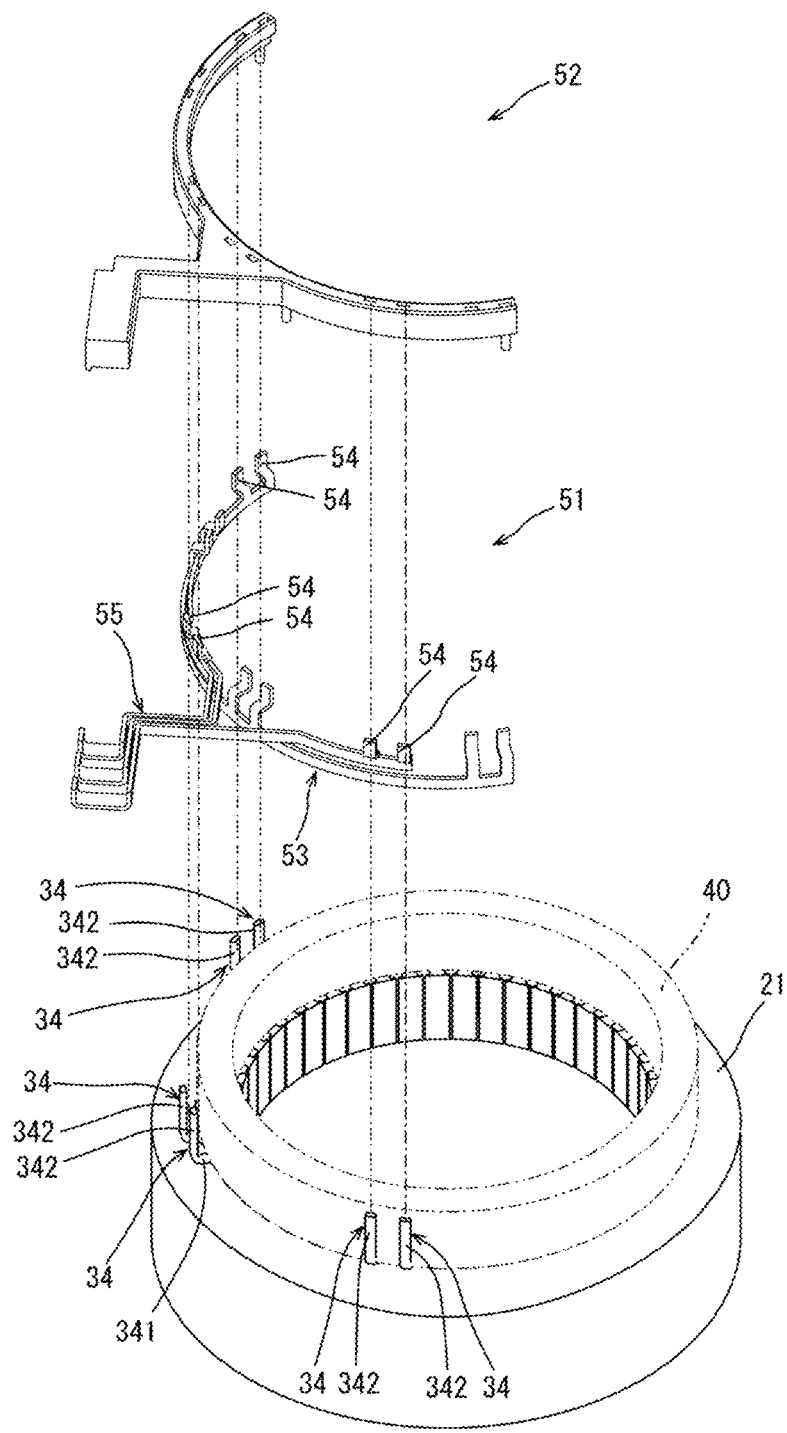
FIG. 8 is an exploded perspective view illustrating a relationship among coil ends, busbars, and the busbar holder.

Next, a relationship between the first coil ends 34, and the busbars 51 and the busbar holder 52 which are included in the busbar unit 50 will be described with reference to FIGS. 2, 5, and 8. FIG. 8 is an exploded perspective view illustrating the relationship among the first coil ends 34, the busbars 51, and the busbar holder 52. In FIG. 8, the first coil ends 34 included in the coil end portion 40 are indicated by a solid line, and the coil end portion 40 excluding the first coil ends 34 is indicated by a two-dot chain line for the sake of description.

As illustrated in FIG. 8, the six first coil ends 34 are arranged in pairs in the circumferential direction. Four of the six first coil ends 34 are located on the first side in the circumferential direction with respect to external terminal connection portions 55, and two of the six first coil ends 34 are located on the second side in the circumferential direction with respect to the external terminal connection portions 55.

As described above, each of the six first coil ends 34 has the axial support portion 341 extending in the radial direction and the radial external support portion 342 extending in the axial direction.

The four busbars 51 are located radially inside of the radial external support portions 342 of the first coil ends 34 on the outer peripheral side of the coil end portion 40 in a state of being covered with the busbar holder 52. That is, the radial external support portions 342 of the first coil ends 34 support the busbars 51 from radially outside of the busbar holder 52.

Thus, the busbars 51 covered with the busbar holder 52 can be positioned in the radial direction with respect to the coil end portion 40.

The four busbars 51 are positioned on the first side in the axial direction with respect to the axial support portions 341 of the first coil ends 34 in a state of being covered with the busbar holder 52. That is, the axial support portions 341 of the first coil ends 34 support the busbars 51 from the second side in the axial direction with respect to the busbar holder 52.

Thus, the busbars 51 covered with the busbar holder 52 can be positioned in the axial direction with respect to the coil end portion 40.

As described above, in the present embodiment, at least one first coil end 34 is located each on the first side and on the second side in the circumferential direction with respect to the external terminal connection portions 55. Therefore, it is possible to reliably position the busbars 51 in the radial direction and in the axial direction.

As illustrated in FIG. 2, the tips of the first coil ends 34 are connected respectively to the tips of the U-phase busbar connection portions 54u, the V-phase busbar connection portions 54v, and the W-phase busbar connection portions 54w on the radially outer peripheral side and on the first side in the axial direction with respect to the busbar unit 50.

Specifically, as illustrated in FIG. 5, the U-phase busbar 51u is covered by the busbar holder 52 except for the tips of the U-phase busbar connection portions 54u. In this state, the axial support portions 341 of the first coil ends 34 of the U-phase coils 26u extend in the radial direction between the busbar holder 52 and the stator core 21. The radial external support portions 342 of the first coil ends 34 of the U-phase coils 26u extend toward the first side in the axial direction on the radially outer side of the busbar holder 52. The tips of the first coil ends 34 of the U-phase coils 26u are connected to the U-phase busbar connection portions 54u of the U-phase busbar 51u from the radially outer side.

Although not illustrated in detail, the first coil ends 34 of the V-phase coils 26v and the V-phase busbar 51v, and the first coil ends 34 of the W-phase coils 26w and the W-phase busbar 51w also have the same relationship as described above.

Thus, the busbars 51 covered with the busbar holder 52 can be fixed to the coil end portion 40.

In the present embodiment, all the first coil ends 34 serve as the coil end having the axial support portion 341 and the radial external support portion 342. However, the second coil end 35 may serve as the coil end having the axial support portion and the radial external support portion, and the first coil end 34 may be a coil end not having the axial support portion and the radial external support portion. A part of the first coil ends 34 and the second coil ends 35 may serve as the coil end having the axial support portion and the radial external support portion. At least one of the first coil ends 34 and the second coil ends 35 may serve as the coil end having the axial support portion and the radial external support portion.

In the present embodiment, the six coil ends each having the axial support portion 341 and the radial external support portion 342 are arranged such that four of them are located on the first side in the circumferential direction of busbar body portions 53 and two are located on the second side in the circumferential direction with respect to the external terminal connection portions 55 when viewed in the axial direction. However, the coil ends may be arranged such that at least one coil end is located each on the first side and on the second side in the circumferential direction of the busbar body portions 53 with respect to the external terminal connection portions 55 when viewed in the axial direction. Thus, the busbars 51 are supported by the coil ends on at least two locations. Therefore, it is possible to reliably position the busbars 51 in the radial direction and in the axial direction.

In the present embodiment, the coil end having the axial support portion 341 and the radial external support portion 342 is located at a position farthest from the external terminal connection portions 55 on the first side in the circumferential direction of the busbar body portions 53 with respect to the external terminal connection portions 55 and is not located at a position farthest from the external terminal connection portions 55 on the second side in the circumferential direction when viewed in the axial direction. However, the coil end may be located at positions farthest from the external terminal connection portions 55 on the first side and on the second side in the circumferential direction of the busbar body portions 53 with respect to the external terminal connection portions 55 when viewed in the axial direction.

With this configuration, the busbars 51 can be supported by the coil ends at two places farthest from the external terminal connection portions 55 across the external terminal connection portions 55. Therefore, it is possible to more reliably position the busbars 51 in the radial direction and in the axial direction.

As described above, the stator 2 according to the present embodiment includes: the stator core 21 having the plurality of slots 24 extending in the axial direction; the multi-phase coils 26 partially accommodated in the plurality of slots 24; the plurality of external terminals 61; and the plurality of busbars 51 electrically connecting the plurality of external terminals 61 and the multi-phase coils 26. Each of the multi-phase coils 26 has the first coil end 34 that is located at an end of the coil and protrudes from the radially outermost side of the slot 24 to the first side in the axial direction of the stator core 21. Each of the busbars 51 includes: the busbar body portion 53 that is positioned to overlap the first coil end 34 when viewed in the radial direction of the stator core 21 and that extends in the circumferential direction of the stator core 21; a busbar connection portion 54 extending from the busbar body portion 53 toward the first side in the axial direction; and the external terminal connection portion 55 extending outward in the radial direction from the busbar body portion 53 and connected to the external terminal 61.

At least one of the first coil ends 34 of the multi-phase coils 26 extends in the radial direction through between the busbar body portion 53 and the stator core 21 in the axial direction, extends toward the first side in the axial direction on the radially outer side of the busbar body portion 53, and has a tip that is connected to the busbar connection portion 54 from the radially outer side.

With the configuration described above, the plurality of busbars 51 is positioned in the axial direction and in the radial direction by the first coil end 34 having the axial support portion 341 and the radial external support portion 342. Thus, the plurality of busbars 51 can be easily arranged without being displaced in the axial direction and in the radial direction during manufacture of the stator 2.

In the present embodiment, the multi-phase coils 26 include the three-phase coils 26u, 26v, and 26w. As described above, the configuration of the present embodiment can be applied to the stator 2 in which the three-phase coils 26u, 26v, and 26w are wound around the stator core 21.

The stator 2 according to the present embodiment includes the busbar holder 52 made of resin and covering the plurality of busbars 51 except for the tips of the busbar connection portions 54. The first coil ends 34 supporting the busbars 51 extend in the radial direction through between the busbar holder 52 and the stator core 21, extend toward the first side in the axial direction on the radially outer side of the busbar holder 52, and have tips that are connected to the busbar connection portions 54 from the radially outer side.

As described above, the plurality of busbars 51 is covered with the busbar holder 52, so that they are not positionally displaced. In addition, the plurality of busbars 51 covered with the busbar holder 52 can be supported by the first coil ends 34 supporting the busbars 51. Thus, the busbars 51 can be more easily disposed during manufacture of the stator 2.

The motor 1 according to the present embodiment includes the stator 2 having the above configuration. As a result, the motor 1 including the stator 2 having the above configuration can be obtained.

Next, a method for manufacturing the stator 2 will be described. The method for manufacturing the stator 2 includes a stator core fabrication step, a coil arrangement step, a coil end formation step, a busbar molding step, a busbar arrangement step, and a busbar connection step.

In the stator core fabrication step, a plurality of punched steel sheets is layered to manufacture the stator core 21 of the stator 2.

In the coil arrangement step, the segment coils 27 are inserted into the slots 24 of the stator core 21 from the second side in the axial direction so that the segment coil end portions 32 protrude to the first side in the axial direction of the stator core 21. In the present embodiment, the first coil ends 34 and the second coil ends 35 of the three-phase coils 26 are ends of the segment coils 27 located on the radially outermost side of the slots 24. Therefore, the first coil ends 34 and the second coil ends 35 protrude from the radially outermost side of the slots 24 to the first side in the axial direction of the stator core 21.

In the coil end formation step, the part of the first coil end 34 protruding from the stator core 21 is bent outward in the radial direction, and the tip side is bent to the first side in the axial direction. As a result, the first coil end 34 is provided with the axial support portion 341 extending outward in the radial direction from the part protruding from the stator core 21, and the radial external support portion 342 extending to the first side in the axial direction from the tip of the axial support portion 341.

In the busbar molding step, the four busbars 51 are molded with resin in a state of being fixed in a mold (not illustrated). Accordingly, the four busbars 51 are covered with the resin.

In the busbar arrangement step, the four busbars 51 covered with resin are arranged on the first side in the axial direction and on the inside in the radial direction of the first coil ends 34 each having the axial support portion 341 and the radial external support portion 342.

In the busbar connection step, the tips of the coil ends each having the axial support portion 341 and the radial external support portion 342 are connected to the tips of the busbar connection portions 54.

That is, the method for manufacturing the stator 2 according to the present embodiment is a method for manufacturing the stator 2 in which the multi-phase coils 26 which are partially accommodated in the plurality of slots 24 of the stator core 21 and the external terminals 61 are electrically connected by the busbars 51. The method for manufacturing the stator 2 includes: the coil arrangement step for inserting the multi-phase coils 26 into the slots 24 and allowing the first coil ends 34 of the multi-phase coils 26 to protrude from the radially outermost side of the slots 24 to the first side in the axial direction of the stator core 21; the coil end formation step for bending at least one of the first coil ends 34 of the multi-phase coils 26 outward in the radial direction and bending a tip side of the coil end to the first side in the axial direction to form a coil end that supports the busbar 51; the busbar arrangement step for placing at least one of the plurality of busbars 51 on the first side in the axial direction and on an inside in the radial direction of the coil end that supports the busbar 51, each of the plurality of busbars 51 including the busbar body portion 53 extending in the circumferential direction of the stator core 21 and the busbar connection portion 54 extending to the first side in the axial direction from the busbar body portion 53; and the busbar connection step for connecting the first coil end 34 and the second coil end 35 to the busbar connection portions 54.

Through the above steps, it is possible to obtain the stator 2 in which the coil end that positions the busbars 51 in the radial direction and in the axial direction is formed on at least one of the first coil ends 34 of the multi-phase coils 26.

In the present embodiment, the multi-phase coils 26 include the three-phase coils 26u, 26v, and 26w. As described above, the method described above can be applied to a method for manufacturing the stator 2 in which the three-phase coils 26u, 26v, and 26w are wound around the stator core 21.

Figure 9:
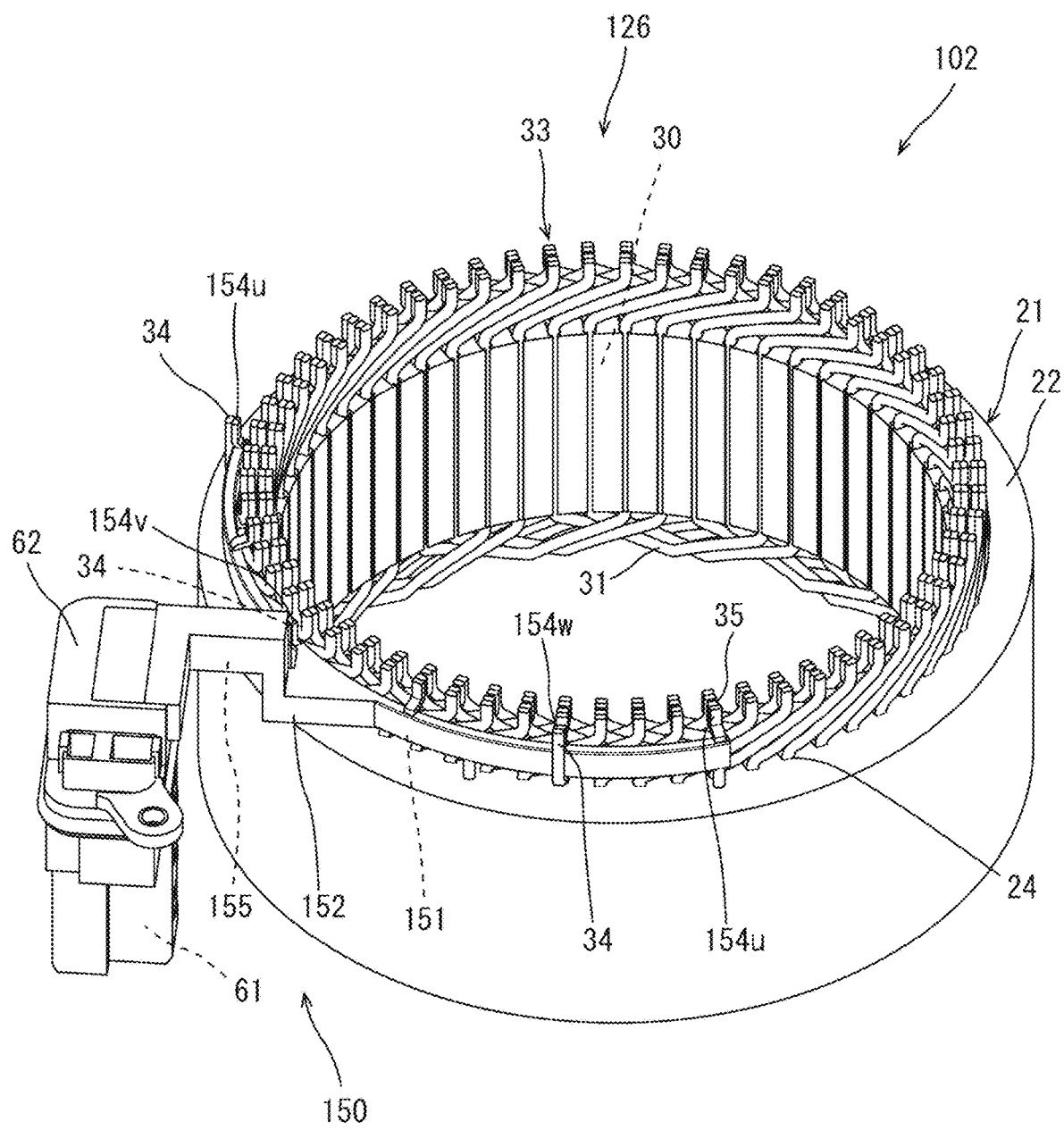
FIG. 9 is a diagram, corresponding to FIG. 2, illustrating a stator according to a second embodiment.
Figure 10:
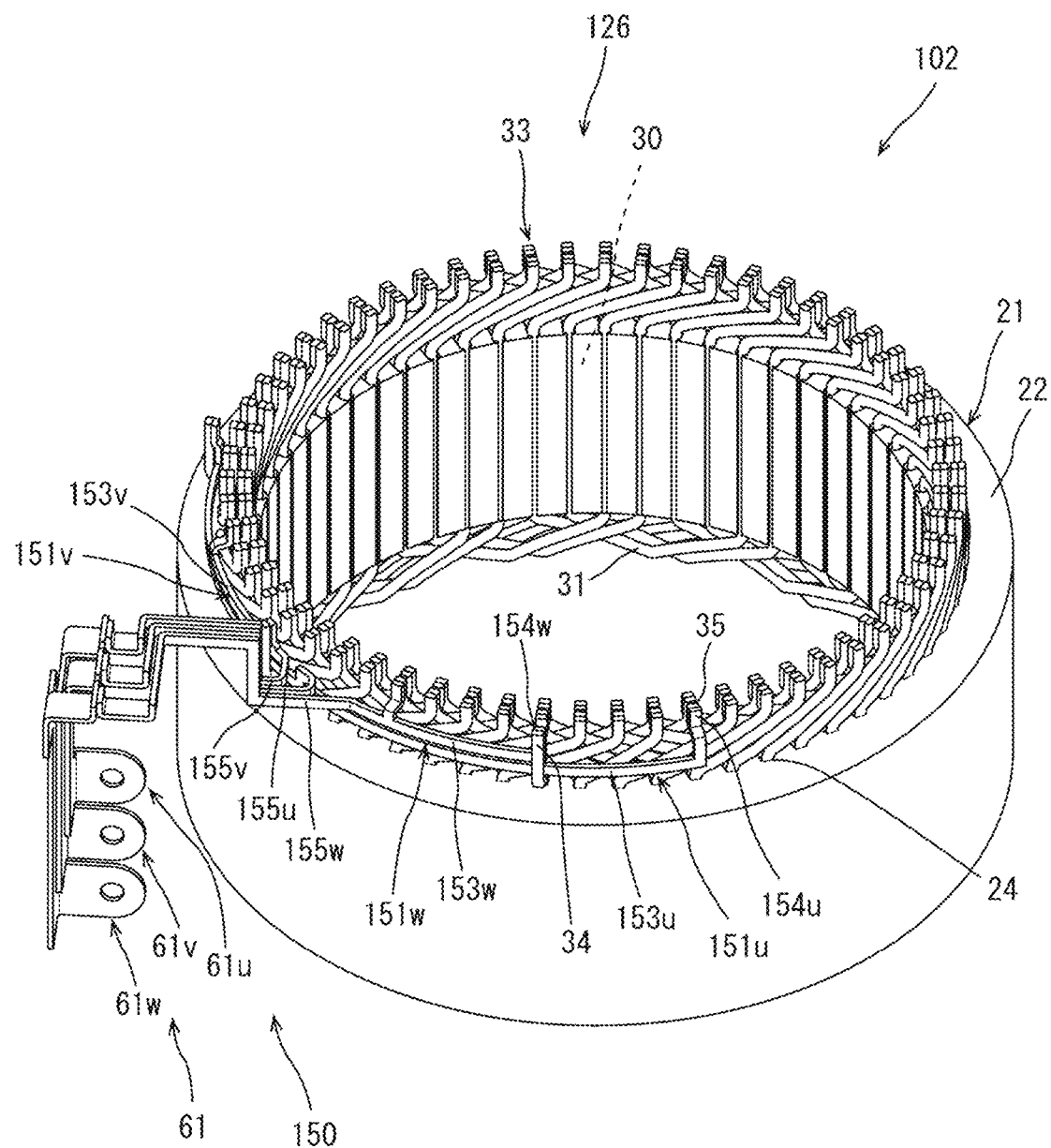
FIG. 10 is a diagram, corresponding to FIG. 3, illustrating the stator according to the second embodiment.

FIGS. 9 and 10 illustrate a schematic configuration of a stator 102 of a motor according to a second embodiment. The motor according to the second embodiment is different from the motor 1 according to the first embodiment in the method of connecting coils 126 by busbars 151. In the following, the same components as those in the first embodiment will be designated by the same reference numerals and the description thereof will be omitted. Only the parts different from those in the first embodiment will be described. FIG. 9 is a perspective view of the stator 102. FIG. 10 is a diagram illustrating a state in which a busbar holder 152 and an external terminal holder 62 of a busbar unit 150 are removed from the stator 102 illustrated in FIG. 9.

The stator 102 includes a stator core 21, the coils 126, and the busbar unit 150.

The coils 126 include a U-phase coil 126u, a V-phase coil 126v, and a W-phase coil 126w. The U-phase coil 126u, the V-phase coil 126v, and the W-phase coil 126w are wound around a plurality of teeth 23 of the stator core 21 in distributed winding, and are Δ-connected by the busbars 151 of the busbar unit 150. The winding of the U-phase coil 126u, the V-phase coil 126v, and the W-phase coil 126w with respect to the stator core 21 is similar to that in the first embodiment.

In each of the U-phase coil 126u, the V-phase coil 126v, and the W-phase coil 126w, a plurality of segment coils 27 is connected in series. The configuration of the segment coils is similar to that in the first embodiment, and thus, the description thereof will be omitted.

As in the first embodiment, the first coil end 34 and the second coil end 35 of each of the U-phase coil 126u, the V-phase coil 126v, and the W-phase coil 126w extend from the slot accommodation portions 30 located on the radially outermost side of the slots 24 and protrude to the first side in the axial direction of the stator core 21. In the present embodiment, the U-phase coil 126u, the V-phase coil 126v, and the W-phase coil 126w each include one first coil end 34 and one second coil end 35. Therefore, three first coil ends 34 and three second coil ends 35 are located on the first side in the axial direction with respect to the stator core 21.

As illustrated in FIG. 9, the busbar unit 150 includes the busbars 151, the busbar holder 152, external terminals 61, and the external terminal holder 62.

Figure 11:
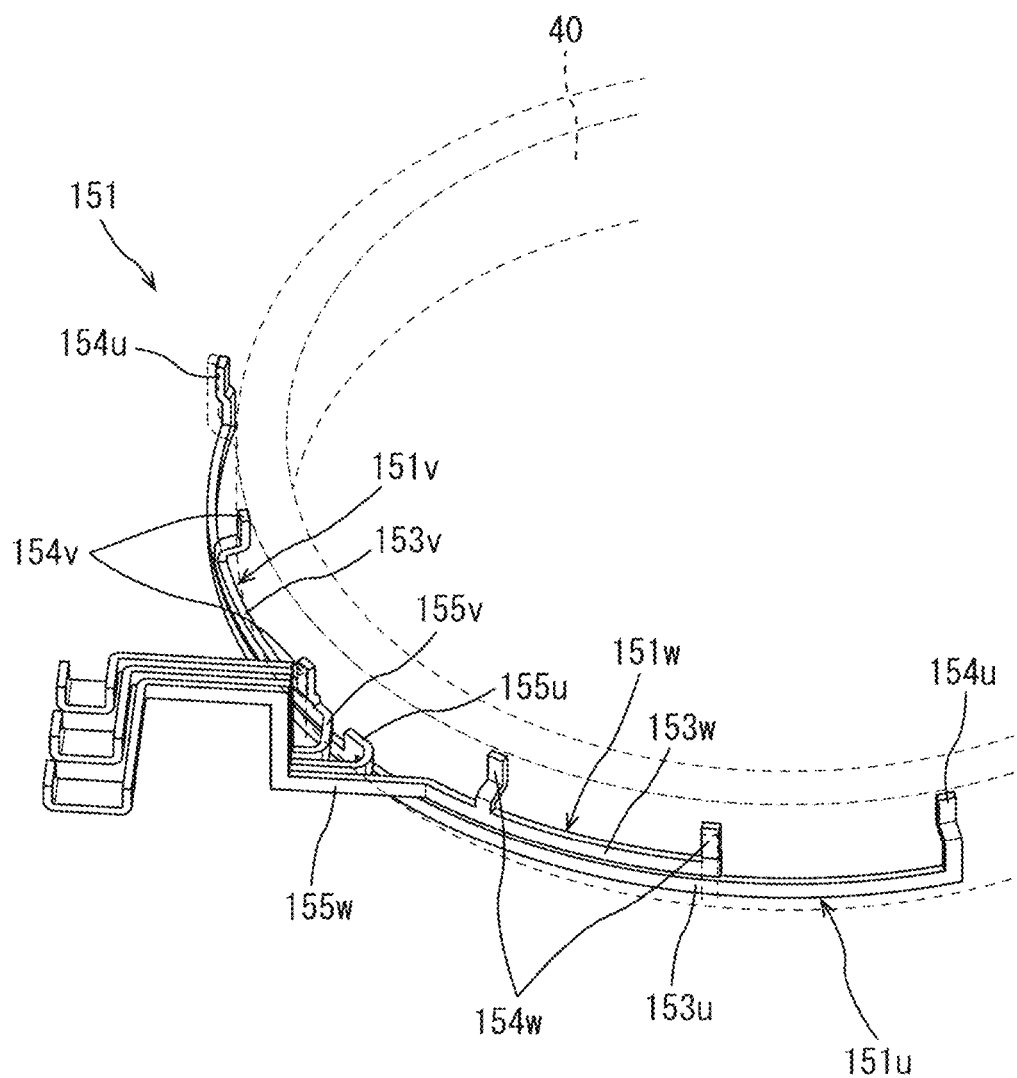
FIG. 11 is a diagram, corresponding to FIG. 7, illustrating busbars according to the second embodiment.

As illustrated in FIGS. 10 and 11, the busbars 151 include a U-phase busbar 151u, a V-phase busbar 151v, and a W-phase busbar 151w. Each of the U-phase busbar 151u, the V-phase busbar 151v, and the W-phase busbar 151w is a plate-like member. The thickness direction of each of the U-phase busbar 151u, the V-phase busbar 151v, and the W-phase busbar 151w coincides with the radial direction of the stator core 21.

The U-phase busbar 151u includes a U-phase busbar body portion 153u, two U-phase busbar connection portions 154u, and a U-phase external terminal connection portion 155u. The U-phase busbar body portion 153u, the two U-phase busbar connection portions 154u, and the U-phase external terminal connection portion 155u are integrally formed as a single member.

The V-phase busbar 151v includes a V-phase busbar body portion 153v, two V-phase busbar connection portions 154v, and a V-phase external terminal connection portion 155v. The V-phase busbar body portion 153v, the two V-phase busbar connection portions 154v, and the V-phase external terminal connection portion 155v are integrally formed as a single member.

The W-phase busbar 151w includes a W-phase busbar body portion 153w, two W-phase busbar connection portions 154w, and a W-phase external terminal connection portion 155w. The W-phase busbar body portion 153w, the two W-phase busbar connection portions 154w, and the W-phase external terminal connection portion 155w are integrally formed as a single member.

Each of the U-phase busbar body portion 153u, the V-phase busbar body portion 153v, and the W-phase busbar body portion 153w has an arc shape along the outer periphery of a coil end portion 40 when viewed in the axial direction. Each of the U-phase busbar body portion 153u, the V-phase busbar body portion 153v, and the W-phase busbar body portion 153w is positioned to overlap the first coil end 34 of the coil 126 of each phase when viewed in the radial direction of the stator core 21, and extends in the circumferential direction of the stator core 21.

Specifically, the U-phase busbar body portion 153u is positioned to overlap the first coil end 34 of the U-phase coil 126u and the second coil end 35 of the W-phase coil 126w when viewed in the radial direction of the stator core 21, and extends in the circumferential direction of the stator core 21. The U-phase busbar body portion 153u is longer in the circumferential direction than the V-phase busbar body portion 153v and the W-phase busbar body portion 153w. That is, both ends of the U-phase busbar body portion 153u in the circumferential direction are located at positions distant from both ends of the V-phase busbar body portion 153v in the circumferential direction and from both ends of the W-phase busbar body portion 153w in the circumferential direction.

The V-phase busbar body portion 153v is positioned to overlap the first coil end 34 of the V-phase coil 126v and the second coil end 35 of the U-phase coil 126u when viewed in the radial direction of the stator core 21, and extends in the circumferential direction of the stator core 21.

The W-phase busbar body portion 153w is positioned to overlap the first coil end 34 of the W-phase coil 126w and the second coil end 35 of the V-phase coil 126v when viewed in the radial direction of the stator core 21, and extends in the circumferential direction of the stator core 21.

The U-phase external terminal connection portion 155u extends outward from a position other than both ends of the U-phase busbar body portion 153u in the radial direction and is connected to the external terminal 61. The V-phase external terminal connection portion 155v extends outward from one end of the V-phase busbar body portion 153v in the radial direction and is connected to the external terminal 61. The W-phase external terminal connection portion 155w extends outward from one end of the W-phase busbar body portion 153w in the radial direction and is connected to the external terminal 61.

The configurations of the U-phase external terminal connection portion 155u, the V-phase external terminal connection portion 155v, and the W-phase external terminal connection portion 155w are similar to those in the first embodiment except that extension portions are bent in the axial direction of the stator core 21. Therefore, the detailed description of the U-phase external terminal connection portion 155u, the V-phase external terminal connection portion 155v, and the W-phase external terminal connection portion 155w will be omitted.

The two U-phase busbar connection portions 154u extend to the first side in the axial direction of the stator core 21 from both ends of the U-phase busbar body portion 153u, and are connected to the first coil end 34 of the U-phase coil 126u and the second coil end 35 of the W-phase coil 126w.

The two V-phase busbar connection portions 154v extend to the first side in the axial direction of the stator core 21 from both ends of the V-phase busbar body portion 153v, and are connected to the first coil end 34 of the V-phase coil 126v and the second coil end 35 of the U-phase coil 126u.

The two W-phase busbar connection portions 154w extend to the first side in the axial direction of the stator core 21 from both ends of the W-phase busbar body portion 153w, and are connected to the first coil end 34 of the W-phase coil 126w and the second coil end 35 of the V-phase coil 126v.

The U-phase busbar 151u, the V-phase busbar 151v, and the W-phase busbar 151w are positioned on the outer peripheral side of the coil end portion 40 in the radial direction in a state of partially overlapping with each other in the radial direction or the axial direction.

FIG. 11 illustrates an example of the arrangement of the U-phase busbar 151u, the V-phase busbar 151v, and the W-phase busbar 151w with respect to the coil end portion 40.

As illustrated in FIG. 11, the U-phase external terminal connection portion 155u, the V-phase external terminal connection portion 155v, and the W-phase external terminal connection portion 155w partially overlap each other in the thickness direction.

The W-phase busbar body portion 153w of the W-phase busbar 151w is located on the first side in the circumferential direction with respect to the U-phase external terminal connection portion 155u of the U-phase busbar 151u. The V-phase busbar body portion 153v of the V-phase busbar 151v is located on the second side in the circumferential direction with respect to the U-phase external terminal connection portion 155u of the U-phase busbar 151u. The V-phase external terminal connection portion 155v and the W-phase external terminal connection portion 155w are arranged in the circumferential direction across the U-phase external terminal connection portion 155u.

A part of the U-phase busbar body portion 153u of the U-phase busbar 151u overlaps the W-phase busbar body portion 153w of the W-phase busbar 151w and the V-phase busbar body portion 153v of the V-phase busbar 151v when viewed in the axial direction.

The U-phase busbar 151u, the V-phase busbar 151v, and the W-phase busbar 151w are covered with the busbar holder 152 made of resin except for the tips of the U-phase busbar connection portions 154u, the V-phase busbar connection portions 154v, and the W-phase busbar connection portions 154w (see FIG. 9).

As in the first embodiment, in a state where the U-phase busbar 151u, the V-phase busbar 151v, and the W-phase busbar 151w are covered with the busbar holder 152, the tips of the U-phase busbar connection portions 154u, the V-phase busbar connection portions 154v, and the W-phase busbar connection portions 154w protrude from the busbar holder 152, and are connected to the first coil ends 34 and the second coil ends 35 of the coils 126 of the respective phases.

In the present embodiment, the U-phase coil 126u, the V-phase coil 126v, and the W-phase coil 126w are A-connected by the U-phase busbar 151u, the V-phase busbar 151v, and the W-phase busbar 151w.

Specifically, the first coil end 34 of the U-phase coil 126u is connected to the U-phase busbar connection portion 154u of the U-phase busbar 151u. The first coil end 34 of the V-phase coil 126v is connected to the V-phase busbar connection portion 154v of the V-phase busbar 151v. The first coil end 34 of the W-phase coil 126w is connected to the W-phase busbar connection portion 154w of the W-phase busbar 151w.

The second coil end 35 of the U-phase coil 126u is connected to the V-phase busbar connection portion 154v of the V-phase busbar 151v. The second coil end 35 of the V-phase coil 126v is connected to the W-phase busbar connection portion 154w of the W-phase busbar 151w. The second coil end 35 of the W-phase coil 126w is connected to the U-phase busbar connection portion 154u of the U-phase busbar 151u.

As a result, the stator 102 can be obtained in which the U-phase coil 126u, the V-phase coil 126v, and the W-phase coil 126w wound around the stator core 21 are A-connected by the U-phase busbar 151u, the V-phase busbar 151v, and the W-phase busbar 151w.

Next, a relationship between the first coil ends 34, and the busbars 151 and the busbar holder 152 which are included in the busbar unit 150 will be described with reference to FIG. 9.

As illustrated in FIG. 9, two of the three first coil ends 34 are located on the first side in the circumferential direction with respect to external terminal connection portions 155, and one of the three first coil ends 34 is located on the second side in the circumferential direction with respect to the external terminal connection portions 155.

As in the first embodiment, each of the three first coil ends 34 has an axial support portion extending in the radial direction and a radial external support portion extending in the axial direction.

The three busbars 151 are located radially inside of the radial external support portions of the first coil ends 34 on the outer peripheral side of the coil end portion 40 in a state of being covered with the busbar holder 152. That is, the radial external support portions of the first coil ends 34 support the busbars 151 from radially outside of the busbar holder 152.

Thus, the busbars 151 covered with the busbar holder 152 can be positioned in the radial direction with respect to the coil end portion 40.

The three busbars 151 are positioned on the first side in the axial direction with respect to the axial support portions of the first coil ends 34 in a state of being covered with the busbar holder 152. That is, the axial support portions of the first coil ends 34 support the busbars 151 of the busbar holder 152 from the second side in the axial direction.

Thus, the busbars 151 covered with the busbar holder 152 can be positioned in the axial direction with respect to the coil end portion 40.

As described above, in the present embodiment, the coil ends each having the axial support portion and the radial external support portion are also arranged such that at least one coil end is located each on the first side and on the second side in the circumferential direction of the busbar body portions 153 with respect to the external terminal connection portions 155 when viewed in the axial direction. Therefore, it is possible to reliably position the busbars 151 in the radial direction and in the axial direction.

While the embodiments of the present invention have been described above, the above embodiments are merely examples for implementing the present invention. Thus, the present invention is not limited to the embodiments described above, and the embodiments described above may be appropriately modified and implemented without departing from the scope of the present invention.

In the first and second embodiments, the coils 26, 126 include three-phase coils. However, the coils may include multi-phase coils other than three-phase coils.

In the first embodiment, the coils 26 include two sets of three-phase coils. However, the coils may include one set or three or more sets of three-phase coils.

In the second embodiment, the coils 126 include one set of three-phase coils. However, the coils may include two or more sets of three-phase coils.

In the first and second embodiments, all the second coil connection portions 33 are located on the first side in the axial direction with respect to the stator core 21, and all the first coil connection portions 31 are located on the second side in the axial direction with respect to the stator core 21. However, all the second coil connection portions may be located on the second side in the axial direction with respect to the stator core. All the first coil connection portions may be located on the first side in the axial direction with respect to the stator core. A part of the second coil connection portions may be located on the first side in the axial direction with respect to the stator core. A part of the first coil connection portions may be located on the second side in the axial direction with respect to the stator core. A part of the second coil connection portions may be located on the second side in the axial direction with respect to the stator core. A part of the first coil connection portions may be located on the first side in the axial direction with respect to the stator core.

In the first and second embodiments, the first coil ends 34 and the second coil ends 35 are located on the side where the second coil connection portions 33 are located in the axial direction with respect to the stator core 21. However, the first coil ends may be located on either the first side or the second side in the axial direction with respect to the stator core. In addition, the second coil ends may be located on either the first side or the second side in the axial direction with respect to the stator core.

In the first and second embodiments, the stator core 21 has a cylindrical shape. However, the stator core may have a shape other than the cylindrical shape as long as the stator core is tubular.

In the first and second embodiments, the motor 1 is a so-called inner rotor type motor in which the rotor 3 is located so as to be rotatable about the central axis P in the tubular stator 2. However, the motor may be a so-called outer rotor type motor in which a stator is located in a tubular rotor.

The present invention can be used for a stator that electrically connects a coil having high rigidity and an external device using a connection member located on the outer peripheral side of a coil end portion.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A stator comprising:
    a stator core having a plurality of slots extending in an axial direction;
    multi-phase coils partially accommodated in the plurality of slots;
    a plurality of external terminals; and
    a plurality of busbars electrically connecting the plurality of external terminals and the multi-phase coils, wherein
    each of the multi-phase coils includes a coil end that is located at an end of the coil and that protrudes to a first side in the axial direction of the stator core from an outermost side of the slot in a radial direction,
    each of the plurality of busbars includes
    a busbar body portion that is positioned to overlap the coil end when viewed in the radial direction of the stator core and that extends in a circumferential direction of the stator core,
    a busbar connection portion extending toward the first side in the axial direction from the busbar body portion, and
    an external terminal connection portion extending outward in the radial direction from the busbar body portion and connected to the external terminal,
    at least one of the coil ends of the multi-phase coils extends in the radial direction through between the busbar body portion and the stator core in the axial direction, extends toward the first side in the axial direction on an outside of the busbar body portion in the radial direction, and has a tip connected to the busbar connection portion from the outside in the radial direction, wherein
    at least one coil end that is the coil end supporting the busbars is located each on a first side and on a second side in a circumferential direction of the busbar body portions with respect to the external terminal connection portions when viewed in the axial direction.

2. The stator according to claim 1, wherein
    the multi-phase coils include three-phase coils.

3. The stator according to claim 1, wherein
    the coil ends supporting the busbars are located at positions most distant from the external terminal connection portions on the first side and on the second side in the circumferential direction of the busbar body portions with respect to the external terminal connection portions when viewed in the axial direction.

4. A motor comprising the stator according to claim 1.

5. A stator comprising:
    a stator core having a plurality of slots extending in an axial direction;
    multi-phase coils partially accommodated in the plurality of slots;
    a plurality of external terminals; and
    a plurality of busbars electrically connecting the plurality of external terminals and the multi-phase coils, wherein
    each of the multi-phase coils includes a coil end that is located at an end of the coil and that protrudes to a first side in the axial direction of the stator core from an outermost side of the slot in a radial direction,
    each of the plurality of busbars includes
    a busbar body portion that is positioned to overlap the coil end when viewed in the radial direction of the stator core and that extends in a circumferential direction of the stator core,
    a busbar connection portion extending toward the first side in the axial direction from the busbar body portion, and
    an external terminal connection portion extending outward in the radial direction from the busbar body portion and connected to the external terminal,
    at least one of the coil ends of the multi-phase coils extends in the radial direction through between the busbar body portion and the stator core in the axial direction, extends toward the first side in the axial direction on an outside of the busbar body portion in the radial direction, and has a tip connected to the busbar connection portion from the outside in the radial direction; and
    a busbar holder made of resin and covering the plurality of busbars except for tips of the busbar connection portions, wherein
    the coil end supporting the busbars extends in the radial direction through between the busbar holder and the stator core, extends toward the first side in the axial direction on an outside of the busbar holder in the radial direction, and has a tip connected to the busbar connection portion from the outside in the radial direction.

6. A method for manufacturing a stator in which multi-phase coils that are partially accommodated in a plurality of slots of a stator core are electrically connected to an external terminal using a busbar, the method comprising:
    a coil arrangement step for inserting the multi-phase coils into the slots and allowing coil ends of the multi-phase coils to protrude from an outermost side of the slots in a radial direction to a first side in an axial direction of the stator core;

a coil end formation step for bending at least one of the coil ends of the multi-phase coils outward in the radial direction and bending a tip side of the coil end to the first side in the axial direction to form a coil end that supports the busbar;

a busbar arrangement step for placing at least one of a plurality of busbars on the first side in the axial direction and on an inside in the radial direction of the coil end that supports the busbar, each of the plurality of busbars including a busbar body portion extending in a circumferential direction of the stator core and a busbar connection portion extending to the first side in the axial direction from the busbar body portion; and a busbar connection step for connecting the coil end to the busbar connection portion, wherein at least one coil end that is the coil end supporting the plurality busbars is located each on a first side and on a second side in a circumferential direction of the busbar body portions with respect to the external terminal connection portions when viewed in the axial direction.

7. The method for manufacturing a stator according to claim 6, wherein the multi-phase coils include three-phase coils.

8. A method for manufacturing a stator in which multi-phase coils that are partially accommodated in a plurality of slots of a stator core are electrically connected to an external terminal using a busbar, the method comprising:

a coil arrangement step for inserting the multi-phase coils into the slots and allowing coil ends of the multi-phase coils to protrude from an outermost side of the slots in a radial direction to a first side in an axial direction of the stator core;

a coil end formation step for bending at least one of the coil ends of the multi-phase coils outward in the radial direction and bending a tip side of the coil end to the first side in the axial direction to form a coil end that supports the busbar;

a busbar arrangement step for placing at least one of a plurality of busbars on the first side in the axial direction and on an inside in the radial direction of the coil end that supports the busbar, each of the plurality of busbars including a busbar body portion extending in a circumferential direction of the stator core and a busbar connection portion extending to the first side in the axial direction from the busbar body portion;

a busbar connection step for connecting the coil end to the busbar connection portion; and a busbar holder made of resin and covering the plurality of busbars except for tips of the busbar connection portions, wherein the coil end supporting the busbars extends in the radial direction through between the busbar holder and the stator core, extends toward the first side in the axial direction on an outside of the busbar holder in the radial direction, and has a tip connected to the busbar connection portion from the outside in the radial direction.

* * * * *